(12) United States Patent
Ruggeri

(10) Patent No.: US 9,731,900 B2
(45) Date of Patent: Aug. 15, 2017

(54) MOTORIZED TRANSPORT ROLLER

(71) Applicant: RULLI RULMECA S.P.A., Alme' (BG) (IT)

(72) Inventor: Giovanni Ruggeri, Bergamo (IT)

(73) Assignee: RULLI RULMECA S.P.A., Alme' (BG) (IT)

( * ) Notice: Subject to any disclaimer, the term of this patent is extended or adjusted under 35 U.S.C. 154(b) by 0 days.

(21) Appl. No.: 15/028,383

(22) PCT Filed: Oct. 6, 2014

(86) PCT No.: PCT/IB2014/065085
§ 371 (c)(1),
(2) Date: Apr. 8, 2016

(87) PCT Pub. No.: WO2015/052631
PCT Pub. Date: Apr. 16, 2015

(65) Prior Publication Data
US 2016/0257496 A1    Sep. 8, 2016

(30) Foreign Application Priority Data
Oct. 11, 2013    (IT) .............................. BG2013A0031

(51) Int. Cl.
*B65G 13/06*    (2006.01)
*B65G 23/08*    (2006.01)

(52) U.S. Cl.
CPC .............. *B65G 23/08* (2013.01); *B65G 13/06* (2013.01)

(58) Field of Classification Search
CPC ................................ B65G 13/06; B65G 23/08
USPC ......................................................... 198/788
See application file for complete search history.

(56) References Cited

U.S. PATENT DOCUMENTS

| | | | | |
|---|---|---|---|---|
| 5,088,596 A * | 2/1992 | Agnoff | .................... | B65G 23/08 |
| | | | | 198/788 |
| 5,180,344 A | 1/1993 | Hall | | |
| 8,381,901 B2 * | 2/2013 | Yamamoto | ............. | B65G 13/02 |
| | | | | 198/788 |
| 2013/0334012 A1* | 12/2013 | Lindemann | ............ | B65G 23/08 |
| | | | | 198/789 |
| 2015/0210479 A1* | 7/2015 | Dudek | .................... | B65G 39/02 |
| | | | | 198/781.01 |

FOREIGN PATENT DOCUMENTS

| | | | | |
|---|---|---|---|---|
| DE | 19618248 C1 * | 10/1997 | ............. | B65G 23/08 |
| DE | 102004014989 A1 | 1/2005 | | |
| DE | 102006049327 A1 * | 4/2008 | ............. | B65G 13/06 |
| EP | 1947035 A1 | 7/2008 | | |

* cited by examiner

*Primary Examiner* — Mark A Deuble
(74) *Attorney, Agent, or Firm* — King & Schickli, PLLC

(57) ABSTRACT

Motorized transport roller comprising: a hollow cylindrical body (11) having an idle head (51) on one side and a motor head (20) on the other; a motor (15) arranged inside said roller having a motor shaft (30) protruding from said motor (15); the roller comprising a first element (53) associated with said motor shaft (30); a second element (54) associated with said motor head (20) by means of a transmission shaft (39); a third element (33) intermediate to said first (53) and second (54) element adapted to transfer the motion from said first element (53) to said second element (54); said third element (33) is made of a soft and/or elastic material; and by said motor head (20) rotating said hollow cylindrical body (11).

10 Claims, 3 Drawing Sheets

MOTORIZED TRANSPORT ROLLER

The present invention relates to a motorized transport roller, normally referred to as RollerDrive, for use in roller or conveyor belt transport systems for transferring packages or unpackaged materials. In particular it relates to a transmitting motion system from the motor to the roller for a motorized transport roller.

A roller transport system comprises one or more rollers arranged transversely with respect to the motion. Some of these rollers are motorized (RollerDrives) and allow the movement of the material to be transported.

Said RollerDrives may comprise elements for dragging the other rollers. For example a RollerDrive can be connected to other rollers by means of driving belts or conveyor belt.

A motorized roller is formed by a hollow tubular element internally comprising a motor/reducer and the transmission system.

Purpose of the present invention is to provide a motorized transport roller that is simple to implement.

Another object is to provide a motorized transport roller having a motion transfer from the motor to the roller of an efficient, stable and continuous type.

A further object is to provide a motorized transport roller that is suited to reduce vibrations that may arise.

Another object is to provide a motorized transport roller that can absorb any possible variations in the value of the applied torque or sustained counter torque.

Another purpose is that of obtaining a RollerDrive suited to guarantee an operation that avoids damage to the motor even in conditions of high loads which lead to an inflection of the hollow cylindrical body.

According to the present invention, these aims and yet others are achieved by a motorized transport roller comprising: a hollow cylindrical body having an idle head on one side and a motor head on the other; a motor arranged inside said roller having a motor shaft protruding from said motor; characterized by comprising a first element associated with said motor shaft; a second element associated with said motor head by means of a transmission shaft; a third element intermediate to said first and second element adapted to transfer the motion from said first element to said second element; said third element is made of a soft and/or elastic material; and that said motor head rotates said hollow cylindrical body.

Further characteristics of the invention are described in the dependent claims.

The advantages of this solution compared to the solutions of the prior art are various.

The system ensures an optimal traction regardless of what happens on the tube. This is directly interconnected with the pulley, regardless of the inner surface state of the tube of the roll, the motion of the motor is efficiently transmitted to the adjacent rollers.

The system ensures optimal transmission to the adjacent rollers solving possible problems arising from the slipping of the plastic pulley inside its seat (tube). The problems solved are relative to the coupling between the plastic pulley and the tube in ferrous material, thus making interference between the elements a finishing detail.

The system, justly due to the elasticity of the transmission axis, free to swing inside the tube, thanks to the disconnection system, avoids that the bending of the tube, subject to loads in a uniform way due to possible pretension of the conveyor belt or by the passage of the load on the roller itself, induces the motor unit to work in a misaligned way significantly reducing the performance and operating life of the motor unit itself.

The system allows the complete assembly of the RollerDrive without the use of tools or screws, simply by coupling and pressing the components one to the other. Even the eventual repair of the same is therefore made easy and economical by only using the plastic head extraction equipment.

The so designed system allows a greater safety of the roller table, the motor is connected, in the version with V pulley (even if by means of a disconnection damper) to the motion transmission pulley. In this way the command given to the motor is equivalent to an action on the adjacent rollers (depending on the drive belt).

Due to the design of the disconnection system placed between the motor and the transmission shaft sudden braking of the roller or continuous direction changes are permitted without causing damage to the reducer which is directly connected to the motor. The disconnection system constitutes a sort of soft start suited to absorb torques and counter torques, generated or that may be transmitted to the motor of the entire kinematic chain.

The system thus designed constitutes a modular system. The possibility of coupling components (all designed with an interference interlocking system) allows to assemble the RollerDrive depending on the data requested by the customer with extra-short to extra-long lengths with the composition of several disconnection elements along the transmission shaft. The features and advantages of the present invention will become apparent from the following detailed description of an embodiment thereof, illustrated by way of non-limiting examples in the accompanying drawings, wherein.

Figure 1:
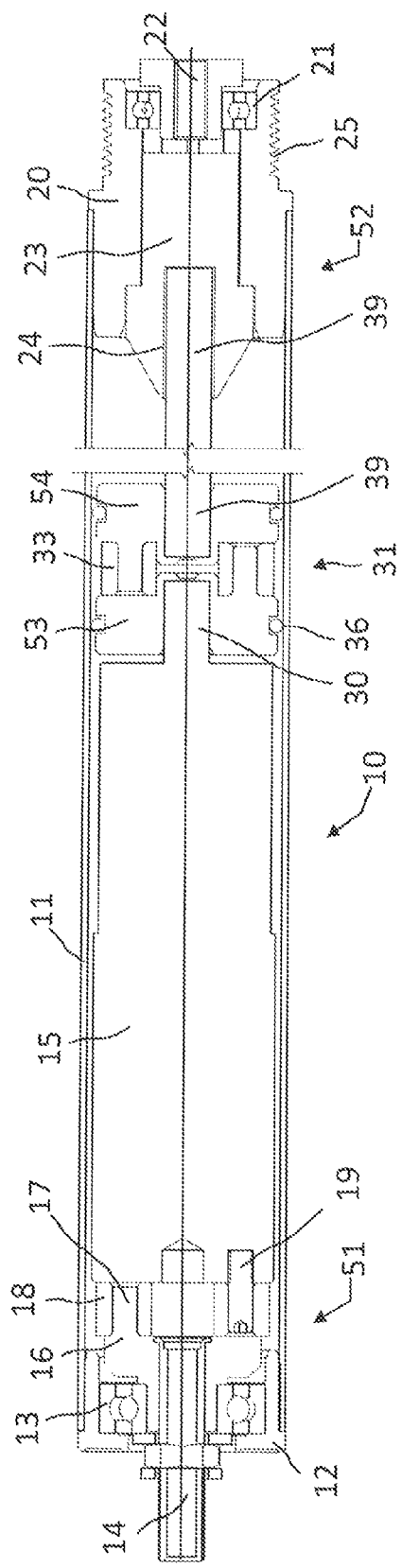
FIG. 1 shows the motorized transport roller, seen in section, according to a first embodiment of the present invention.
Figure 2:
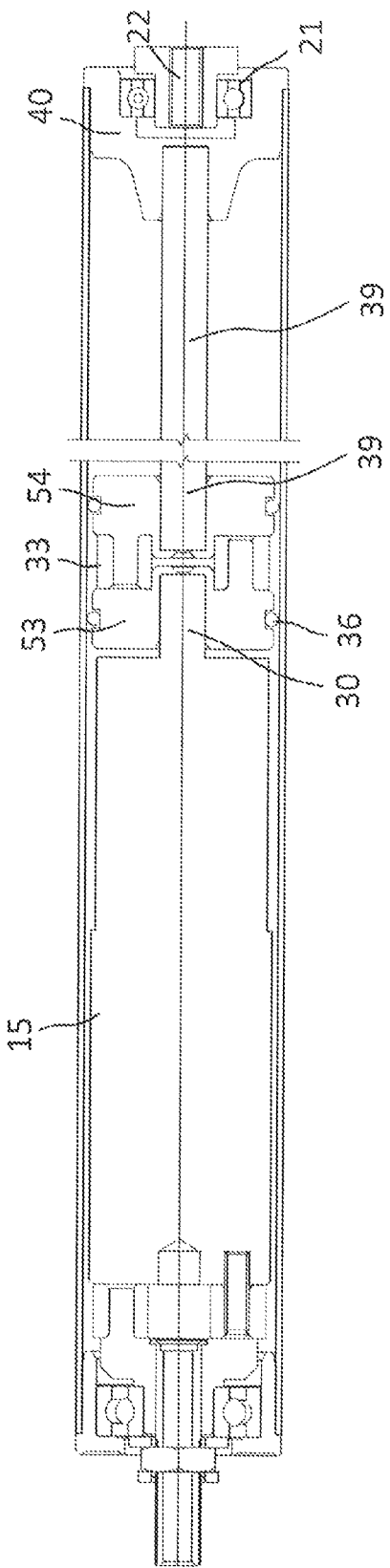
FIG. 2 shows the motorized transport roller, seen in section, according to a second embodiment of the present invention.
Figure 3:
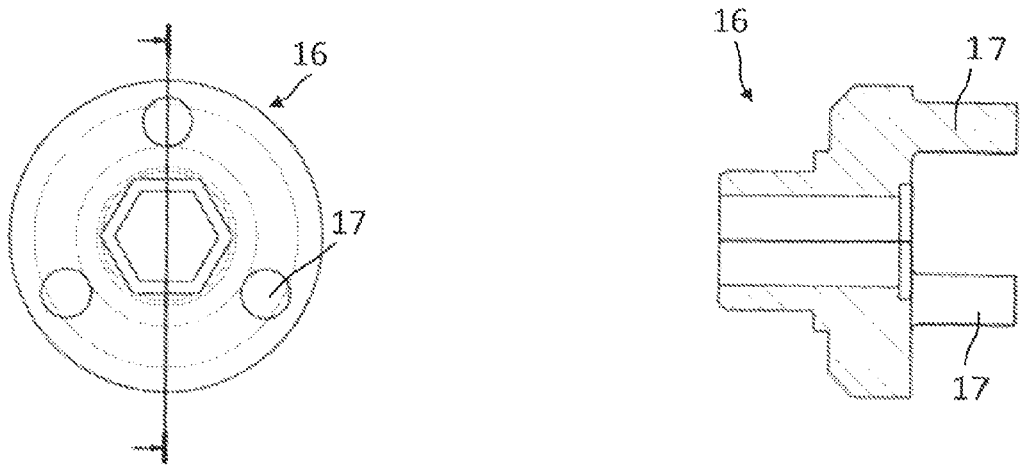
FIG. 3 shows a connection block between the idle head and the motor of a motorized transport roller, seen in section and in perspective, according to the present invention.
Figure 4:
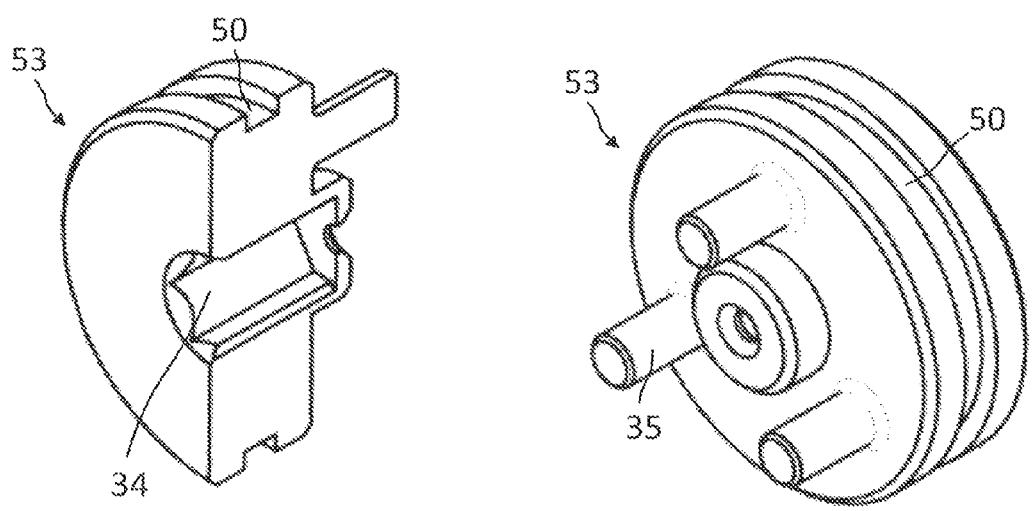
FIG. 4 shows an element of a motorized transport roller disconnection element, seen in section and in perspective, according to the present invention.
Figure 5:
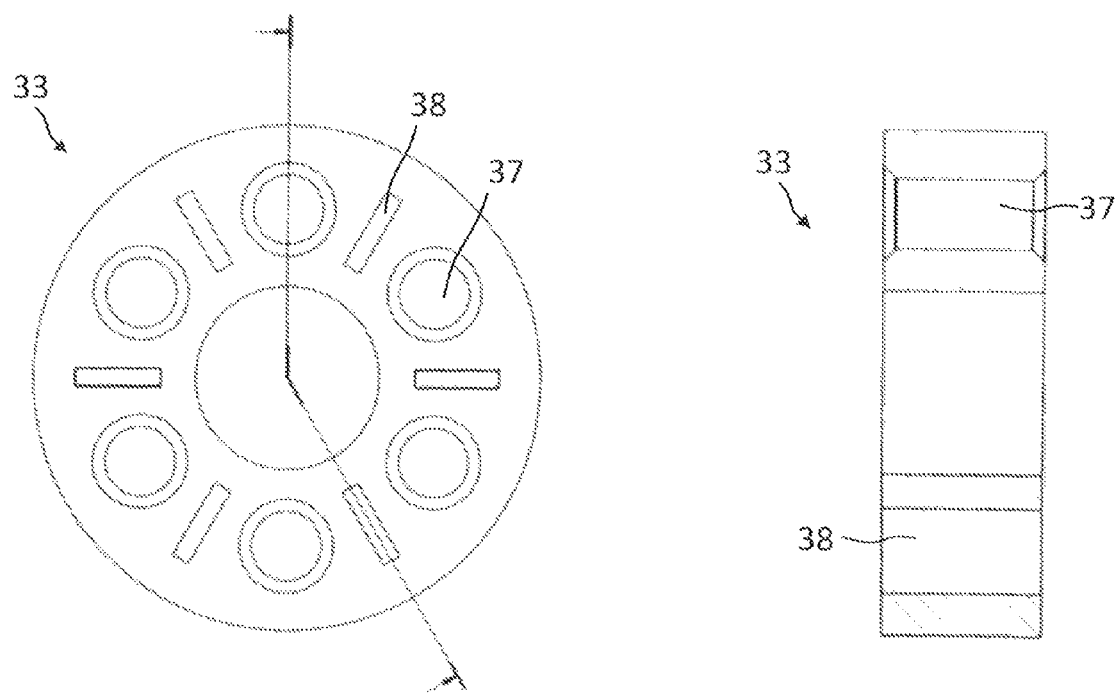
FIG. 5 shows a disconnection intermediate ring of a motorized transport roller, seen in front and in section, according to the present invention.

Referring to the attached figures, a motorized transport roller 10, according to the present invention, comprises a hollow cylindrical body 11.

The hollow, or properly tooled cylindrical body 11 can have different dimensions according to the needs and is normally made from a steel, galvanized steel, stainless steel tube, or other materials, having 50 mm diameter and 1.5 mm thickness, or greater if necessary.

The body 11 for particular applications may have different shapes such as a convex one.

On one side, the body 11 has an idle head 51, preferably antistatic, which comprises a bushing 12, rigidly fixed to the body 11 in a known manner, wherein a bearing 13 is arranged. The bearing 13 allows the rotation of the hollow cylindrical body 11 with respect to a pin 14.

The pin 14 is inserted into a block 16 that has a hole for receiving it of the shape of the pin 14.

The block 16, from the side opposite to where the pin 14 enters, comprises at least two, preferably three, pins 17 arranged along a circumference, which are inserted into a ring 18 of an elastic material, such as rubber, provided with a plurality of holes.

The roller 10 comprises a motor 15, having from the side of the idle head 51, at least two, preferably three, pins 19 which are inserted into the holes of the ring 18.

The ring 18 is adapted to absorb any vibrations generated by the running of the motor 15.

The torque produced by the motor 15 can be multiplied by a reducer in a known manner.

The pin 14 is also hollow on its inside in order to allow the power and control cable of the motor 15 to pass therein.

On the other hand the body 11 has a motor head 52 which comprises a bushing 20, rigidly fixed to the body 11 in a known manner, wherein a bearing 21 is arranged. The bearing 21 allows the bushing 20 to rotate in an independent manner with respect to a floating mounting pin 22.

Inside the bushing 20, in a first embodiment of the present invention, an insert 23 is rigidly fixed, which has a hole 24 having a polygonal section in its side facing the inside of the body 11.

The insert 23 comprises on its outside longitudinal grooves that interfere with longitudinal fins internally arranged inside the bushing 20, so as to allow assembly using only the interference.

In an alternative embodiment the bushing 20 and the insert 23 can be obtained in a single piece.

The bushing 20, in the first embodiment, extends outside of the body 11 for a predetermined distance, and on its circular outer surface a plurality of circular recesses 25 with V-shaped profile are arranged, for use with belts for transferring the motion of the roller 10 to the adjacent rollers that may not include the motor 15.

Alternatively to the recesses 25 the presence of crown gear or systems not integral with the body 11, or friction systems can be provided.

The motor 15 has its own motor shaft 30 which protrudes from the motor 15 towards the motor head 52.

The motorized transport roller 10, according to the present invention, comprises a device called disconnection element 31 formed by two identical and contrasting bodies, joined together by an intermediate ring 33. Referring to the figures, the body 53 is on the left towards the motor 15 and the body 54 is on the right towards the insert 23.

The body 53 (and 54) is a substantially cylindrical structure having on one side a polygonal central hole 34, and on the other side three cylindrical pins 35 which extend towards the outside of the body 53, preferably arranged equally spaced along a circumference. The pins 35 being at least two may be variable in number and shape.

The bodies 53, 54 and the intermediate ring 33 have a diameter less than the diameter of the body 11, so as to rotate freely inside the body 11.

Externally the body 53 (and 54) has a circumferential groove 50 in which a gasket 36 used only for centering the body 53 (and 54) inside the hollow cylindrical body 11 is arranged. The gasket 36, due to its intrinsic structure, is not suited to transfer any motion to the body 11 and it also rotates with the bodies 53 and 54.

The intermediate ring 33 has a cylindrical shape and has six holes 37, possibly through holes, and alternated with the holes 37, in one embodiment of the present invention, there are six recesses 38 having a rectangular section and preferably of a size less than that of the holes 37, allowing greater torsional elasticity to the ring 33.

The bodies 53 and 54 are joined together by way of the ring 33. In particular, the three pins 35 of the left body 53 are inserted into three holes 37 of the ring 33, and the pins 35 of the right body 54 are inserted into the holes 37 previously left free.

The pins 35 and the holes 37 can be of different number and of different shape according to the needs.

The left body 53 receives the motor shaft 30 in the hole 34.

A transmission shaft 39, having preferably a polygonal section, is inserted, from one side, into the hole 34 of the right body 54, and on the other side into the hole 24 of the insert 23.

The transmission shaft 39, as also the shaft 14 and the shaft 30, are preferably polygonal in order to ensure integral fixing with the adjacent bodies without the use of other locking means.

The pins 14 and 22 are arranged to be rigidly fixed, in a known manner, onto a frame of a transport system. In this way the pins 14 and 22 are fixed allowing the body 11 to rotate as a result of the actuation of the motor 15. The motor 15 rotates its motor shaft 30 which transfers its motion to the shaft 39 by means of the disconnection element 31. The shaft 39 rotates the insert 23 (if present) and therefore the bushing 20 about the pin 22. Since the head 20 is integral and rigidly connected with the inner surface of the body 11 of the roller, it rotates the body 11 independently from the pins 14 and 22. Therefore, the motor 15 transfers the motion to the body 11 by means of the succession of the elements 30, 53, 33, 54, 39, 23 (if the case) and 20.

In a second embodiment of the present invention, in place of the bushing 20 a bushing 40 is provided, rigidly fixed to the body 11 in a known manner, which does not extend outside of the body and therefore not having the V shaped circular grooves 25. The bushing 40 in its side facing inside the body 11 has a hole 24 having a polygonal section, like the insert 23.

The bushing 40 also has a bearing 21 that allows it to rotate around a floating pin 22.

In this case, the motor 15 transfers the motion to the body 11 by means of the succession of the elements 30, 53, 33, 54 39 and 40.

The body 53 and 54 is preferably made of a rigid plastic material e.g. a technopolymer such as nylon.

The ring 33 is preferably made of a plastic material with elastic properties such as rubber.

The drive shaft 39 is preferably made of metal.

The disconnection element 31 is designed to decouple the motor shaft 30 from the remaining part of the roller.

In this manner, any bending of the hollow cylindrical body 11 (subjected to concentrated or distributed load) are not transmitted to the motor shaft 30 (which would otherwise damage the motor 15) while ensuring traction uniformity.

The disconnection element 31 also has a vibration damping function and constitutes an adequate resistant type counter torque absorption system as compared to the torque supplied by the motor 15, thanks to the ring 33.

The drive shaft 39 having an appropriate size and shape for transmitting the torque provided by the motor 15, is housed, with appropriate interlocking, in the disconnection element 31 and in the insert 23. Said shaft has suitable stiffness for not flecting (within certain limits) inside the tube.

The length of the shaft 39 is proportional to the length of the roller according to optimized parameters.

All these parts have been designed so as to allow the simplified assembly of the RollerDrive without screws, nuts or stop pins, using only the interference between the various parts that constitute the roller itself.

With considerable lengths of the RollerDrive and consequently of the shaft 39 it is possible to foresee the adoption of one or more disconnection elements 31 to support and to center the drive shaft 39. In this way a straight transmission shaft is ensured.

According to the present invention, the motion of the motor 15 is transmitted to the bushing 20 which has the recesses 25, where the transferring of motion to the other RollerDrives in the system occurs. In case the RollerDrive may have difficulties in transmitting motion to the body 11, the motion would be in any case transmitted to the other rollers by means of the bushing 20. This is because the body 11 is not a drive element as in other cases of the prior art.

The disconnection element 31 has been made so that it is placed very near to the motor 15, in order to have a shaft 39 of as free as possible dimension and at the same time have, if necessary, a RollerDrive of extremely small size, also eliminating the disconnection element 31 and inserting the motor shaft 30 directly into the insert 23.

The materials used, as well as the dimensions, may be any according to the requirements and the state of the art.

The motorized transport roller thus conceived is susceptible to numerous modifications and variations, all falling within the inventive concept; moreover, all details are replaceable by technically equivalent elements.

The invention claimed is:

1. A motorized transport roller comprising: a hollow cylindrical body (11) having an idle head (51) on one side and a motor head (52) on the other; a motor (15) arranged inside said roller having a motor shaft (30) protruding from said motor (15); characterized by comprising a first element (53) associated with said motor shaft (30); a second element (54) associated with said motor head (52) by means of a transmission shaft (39); a third element (33) intermediate to said first (53) and second (54) element suited to positively couple and transfer the motion from said first element (53) to said second element (54); said third element (33) is made of a soft and/or elastic material; and by said motor head (52) rotating said hollow cylindrical body (11).

2. The roller according to claim 1 characterized in that said first element (53) is a substantially cylindrical body having, on one side, a hole (34) for receiving said shaft (30) and on the other side comprising at least one pair of pins (35).

3. The roller according to claim 1 characterized in that said second element (54) is a substantially cylindrical body having, on one side, a hole (34) for receiving said shaft (30) and on the other side comprising at least one pair of pins (35).

4. The roller according to claim 1 characterized in that said third element (33) is a substantially cylindrical body having at least one pair of holes (37).

5. The roller according to claim 1 characterized in that said transmission shaft (39) has a polygonal section.

6. The roller according to claim 1 characterized in that said motor head (52) comprises a bushing having a hole (24) suited to receive said transmission shaft (39).

7. The roller according to claim 1 characterized in that said idle head (51) comprises a pin (14) fixed on one side to a frame of a transport system and on the other side is rigidly fixed to said motor (15).

8. The roller according to claim 1 characterized in that said motor head (52) comprises a bushing (20) fixed to said cylindrical body (11); said transmission shaft (39) is fixed to said bushing (20); said bushing (20) comprises a bearing (21); said bearing (21) allows the bushing (20) to rotate around a pin (22); said pin (22) is fixed to a frame of a transport roller system.

9. The roller according to claim 1 characterized in that said motor head (52) is rigidly fixed to said hollow cylindrical body (11).

10. The roller according to claim 1 characterized in that said first element (53), said second element (54) and said third element (33) have a diameter less than the diameter of said hollow cylindrical body (11).

* * * * *